US012743343B2

(12) United States Patent
Balaji et al.

(10) Patent No.: US 12,743,343 B2
(45) Date of Patent: Sep. 22, 2026

(54) SYSTEMS AND METHODS FOR DISASTER RECOVERY MANAGEMENT

(71) Applicant: JPMORGAN CHASE BANK, N.A., New York, NY (US)

(72) Inventors: Suchithra Balaji, Sugar Land, TX (US); Steve Colvin, Magnolia, TX (US); Rooshir Patel, Katy, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 43 days.

(21) Appl. No.: 18/065,492

(22) Filed: Dec. 13, 2022

(65) Prior Publication Data

US 2024/0193048 A1 Jun. 13, 2024

(51) Int. Cl.
*G06F 11/1446* (2026.01)

(52) U.S. Cl.
CPC ...... *G06F 11/1461* (2013.01); *G06F 11/1451* (2013.01); *G06F 11/1464* (2013.01)

(58) Field of Classification Search
CPC ............ G06F 11/1461; G06F 11/1451; G06F 11/1464
See application file for complete search history.

(56) References Cited

U.S. PATENT DOCUMENTS 7,822,726 B1 * 10/2010 Cardin ................ G06F 11/1458 707/702
9,830,471 B1 * 11/2017 Rokicki .............. G06F 21/6236
10,067,836 B1 * 9/2018 Chopra ............... G06F 11/1458
10,606,705 B1 * 3/2020 Janakiraman ....... G06F 11/1464
11,593,223 B1 * 2/2023 Mehta ................. G06F 11/1448
2006/0288183 A1 * 12/2006 Boaz ................... G06F 11/1451 711/164
2015/0193312 A1 * 7/2015 Nanivadekar ....... G06F 11/1458 707/654
2018/0314457 A1 * 11/2018 Bender .................. G06Q 10/20
2020/0334109 A1 * 10/2020 Natanzon ............ H04L 41/0654
2020/0409815 A1 * 12/2020 Gamliel .............. G06F 11/3447
2021/0334165 A1 * 10/2021 Chopra ................... H04L 67/51
2022/0342774 A1 * 10/2022 Butucea Panait ........ G06N 3/09
2024/0056481 A1 * 2/2024 Ignatius ............. H04L 63/1433

* cited by examiner

*Primary Examiner* — Jigar P Patel
(74) *Attorney, Agent, or Firm* — GREENBERG TRAURIG LLP

(57) ABSTRACT

In some aspects, the techniques described herein relate to a method including: providing a data model; receiving, at a computer application, data parameters, wherein the data parameters correspond to fields of the data model, and wherein the data parameters include an entity type and at least one protection plan detail; instantiating an instance of the entity object, including an instance of a protection plan agreement object and an instance of at least one protection plan detail object, wherein the data parameters are used to populate corresponding fields of the entity object, the protection plan agreement object, and the protection plan detail object; and executing, by a backup product, a data backup event based on the at least one protection plan detail.

20 Claims, 4 Drawing Sheets

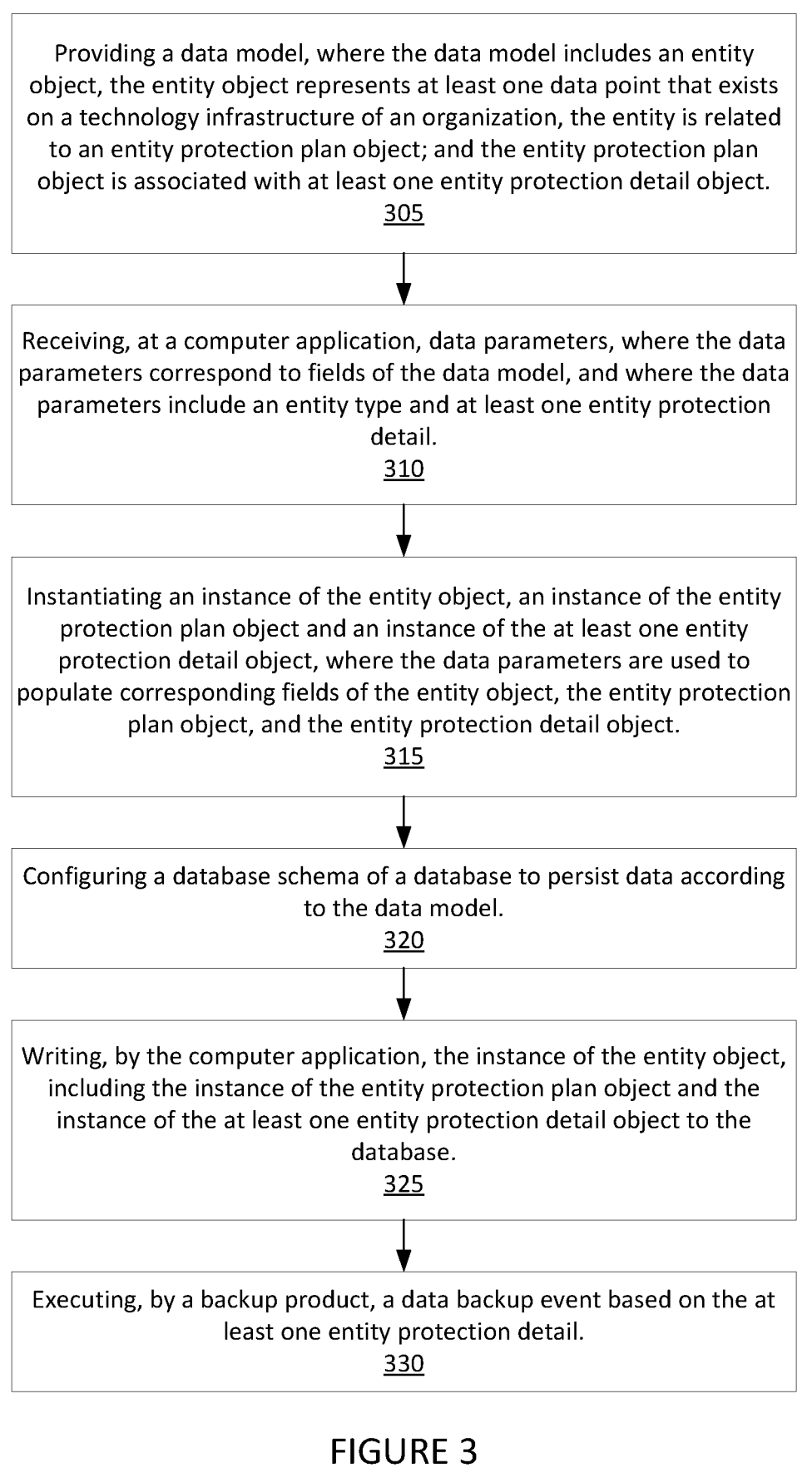

Providing a data model, where the data model includes an entity object, the entity object represents at least one data point that exists on a technology infrastructure of an organization, the entity is related to an entity protection plan object; and the entity protection plan object is associated with at least one entity protection detail object.
305

Receiving, at a computer application, data parameters, where the data parameters correspond to fields of the data model, and where the data parameters include an entity type and at least one entity protection detail.
310

Instantiating an instance of the entity object, an instance of the entity protection plan object and an instance of the at least one entity protection detail object, where the data parameters are used to populate corresponding fields of the entity object, the entity protection plan object, and the entity protection detail object.
315

Configuring a database schema of a database to persist data according to the data model.
320

Writing, by the computer application, the instance of the entity object, including the instance of the entity protection plan object and the instance of the at least one entity protection detail object to the database.
325

Executing, by a backup product, a data backup event based on the at least one entity protection detail.
330

FIGURE 3

SYSTEMS AND METHODS FOR DISASTER RECOVERY MANAGEMENT

BACKGROUND

1. Field of the Invention

Aspects generally relate to systems and methods for disaster recovery management.

2. Description of the Related Art

Conventional disaster recovery software programs (e.g., data backup and restoration software programs) facilitate creation of a duplicate copy of stored data. Such programs allow a user to specify data housed in a production digital storage medium. The disaster recovery program then makes a copy of the specified data, and that copy is generally written to a second (backup) storage medium so as to make a redundant copy of the specified data. Often the second storage medium is located in, or transported to, a different physical location to reduce the risk of data loss due to physical destruction of the production storage medium.

Conventional disaster recovery software is generally managed by an administrator that specifies the data for backup operations. This model, however, results in data owners and program owners being distanced or removed from the disaster recovery process. This, in turn, results in inefficient use of backup storage mediums because backup administrators will tend to be over-inclusive with respect to the data and programs that they specify in backup operations. Inefficient use of backup mediums is further incentivized because individual data/program owners cannot be readily billed for the used backup resources. Moreover, the removal of the data and/or program owner from the backup and recovery process makes internal and regulatory compliance, including certification of backups and of non-backups, difficult since the primary stakeholder (i.e., the data or program owner) is only tangentially involved in the backup and recovery process.

SUMMARY

In some aspects, the techniques described herein relate to a method including: providing a data model, wherein: the data model includes an entity object; the entity object represents at least one data point that exists on a technology infrastructure of an organization; the entity object is related to a protection plan agreement object; and the protection plan agreement object is associated with at least one protection plan detail object; receiving, at a computer application, data parameters, wherein the data parameters correspond to fields of the data model, and wherein the data parameters include an entity type and at least one protection plan detail; instantiating an instance of the entity object, including an instance of the protection plan agreement object and an instance of the at least one protection plan detail object, wherein the data parameters are used to populate corresponding fields of the entity object, the protection plan agreement object, and the at least one protection plan detail object; and executing, by a backup product, a data backup event based on the at least one protection plan detail.

In some aspects, the techniques described herein relate to a method, including: configuring a database schema of a database to persist data according to the data model.

In some aspects, the techniques described herein relate to a method, including: writing, by the computer application, the instance of the entity object, including the instance of the protection plan agreement object and the instance of the at least one protection plan detail object to the database.

In some aspects, the techniques described herein relate to a method, wherein the data model includes a data protection plan object, wherein the data protection plan object is related to the protection plan agreement object, and wherein the data protection plan object includes a backup product field.

In some aspects, the techniques described herein relate to a method, including: instantiating an instance of the data protection plan object, wherein the backup product field is populated with a value that specifies the backup product.

In some aspects, the techniques described herein relate to a method, wherein the entity object is a subtype object.

In some aspects, the techniques described herein relate to a method, wherein the subtype object is an application entity.

In some aspects, the techniques described herein relate to a system including at least one computer, wherein the at least one computer includes a memory and a processor, wherein the memory is coupled to the processor, wherein the memory stores program instructions executable by the processor, and wherein the program instructions configure the processor to: provide a data model, wherein: the data model includes an entity object; the entity object represents at least one data point that exists on a technology infrastructure of an organization; the entity object is related to a protection plan agreement object; and the protection plan agreement object is associated with at least one protection plan detail object; receive data parameters, wherein the data parameters correspond to fields of the data model, and wherein the data parameters include an entity type and at least one protection plan detail; instantiate an instance of the entity object in the memory, including an instance of the protection plan agreement object and an instance of the at least one protection plan detail object, wherein the data parameters are used to populate corresponding fields of the entity object, the protection plan agreement object, and the at least one protection plan detail object; and execute a data backup event based on the at least one protection plan detail.

In some aspects, the techniques described herein relate to a system, wherein the program instructions configure the processor to: configure a database schema of a database to persist data according to the data model.

In some aspects, the techniques described herein relate to a system, wherein the program instructions configure the processor to: write the instance of the entity object, including the instance of the protection plan agreement object and the instance of the at least one protection plan detail object to the database.

In some aspects, the techniques described herein relate to a system, wherein the data model includes a data protection plan object, wherein the data protection plan object is related to the protection plan agreement object, and wherein the data protection plan object includes a backup product field.

In some aspects, the techniques described herein relate to a system, wherein the program instructions configure the processor to: instantiate an instance of the data protection plan object, wherein the backup product field is populated with a value that specifies the backup product.

In some aspects, the techniques described herein relate to a system, wherein the entity object is a subtype object.

In some aspects, the techniques described herein relate to a system, wherein the subtype object is an application entity.

In some aspects, the techniques described herein relate to a non-transitory computer readable storage medium, including instructions stored thereon, which instructions, when read and executed by one or more computer processors, cause the one or more computer processors to perform steps including: providing a data model, wherein: the data model includes an entity object; the entity object represents at least one data point that exists on a technology infrastructure of an organization; the entity object is related to a protection plan agreement object; and the protection plan agreement object is associated with at least one protection plan detail object; receiving, at a computer application, data parameters, wherein the data parameters correspond to fields of the data model, and wherein the data parameters include an entity type and at least one protection plan detail; instantiating an instance of the entity object, including an instance of the protection plan agreement object and an instance of the at least one protection plan detail object, wherein the data parameters are used to populate corresponding fields of the entity object, the protection plan agreement object, and the at least one protection plan detail object; and executing, by a backup product, a data backup event based on the at least one protection plan detail.

In some aspects, the techniques described herein relate to a non-transitory computer readable storage medium, including: configuring a database schema of a database to persist data according to the data model.

In some aspects, the techniques described herein relate to a non-transitory computer readable storage medium, including: writing, by the computer application, the instance of the entity object, including the instance of the protection plan agreement object and the instance of the at least one protection plan detail object to the database.

In some aspects, the techniques described herein relate to a non-transitory computer readable storage medium, wherein the data model includes a data protection plan object, wherein the data protection plan object is related to the protection plan agreement object, and wherein the data protection plan object includes a backup product field.

In some aspects, the techniques described herein relate to a non-transitory computer readable storage medium, including: instantiating an instance of the data protection plan object, wherein the backup product field is populated with a value that specifies the backup product.

In some aspects, the techniques described herein relate to a non-transitory computer readable storage medium, wherein the entity object is a subtype object, and wherein the subtype object is an application entity.

BRIEF DESCRIPTION OF THE DRAWINGS

FIG. 3 is a logical flow for disaster recovery management.

DETAILED DESCRIPTION

Figure 1:
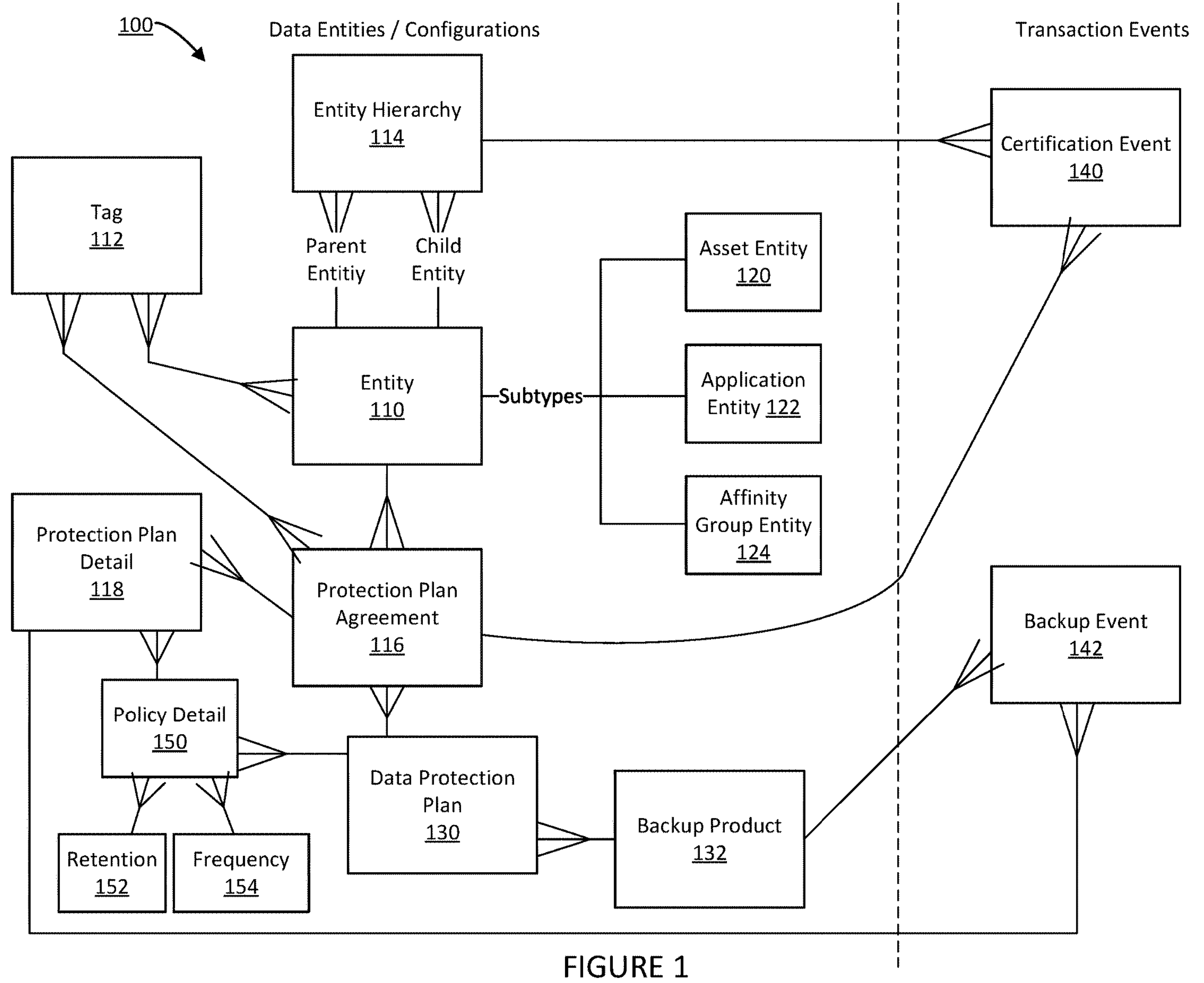
FIG. 1 is a block diagram of a data model for a disaster recovery management platform, in accordance with aspects.

Aspects generally relate to systems and methods for disaster recovery management.

In accordance with aspects, disaster recovery management systems and methods described herein facilitate the direct participation of data owners and application owners in the disaster recovery process of an organization through a disaster recovery management platform. A disaster recovery management platform may include a data model designed to optimize disaster recovery processes and software/logic that leverages the data model. The techniques described herein provide for visualization, certification, billing, and other processes related to disaster recovery operations such as data backup, backup frequency, backup retention, certifications of compliance, etc., by the data owner, and allow the owner to set the context of a data protection plan with respect to their data/programs. The context of a data protection plan may be set, and data protection plans may be created within the scope of a standardized data model around which the disaster recovery management platform is designed and functions.

In accordance with aspects, a disaster recovery management platform may include a user interface (UI) layer that authenticates human users and provides a user interface (e.g., a web interface, or an application interface) through which users may interact with the disaster recovery management system. A disaster recovery management system may also include an application layer that includes a policy service application. The policy service application may include an application programming interface (API) that handles requests (e.g., API method calls) from the UI layer and/or from a consumer application, authenticates requests based on assigned roles and performs related application services based on the requests. A disaster recovery management system may additionally include a database that stores data protection plans used by a disaster recovery management platform and application and that is queried from the application layer. A database may further be configured to store data protection plan according to a standardized data model.

In accordance with aspects, a user of a disaster recovery management system may interact with a UI layer of the system. The UI layer may provide a user with access to features and/or services provided by the application layer. Services provided by the application layer may include user authentication and verification services; backup policy services that query a database and return policies associated with host and backup execution information; a reporting service that provides endpoints (e.g., exposed API methods) for viewing backup-related information such as backed-up assets, backup policies, policy execution results, etc.; and a notification service that facilitates notifications to users with respect to certifications, certification expirations, certification waivers, bills and other related information.

In accordance with aspects, a disaster recovery management platform may be integrated with a data model to facilitate declarative, metadata-driven, codeless management of the platform. The platform may allow management of asset types, tags, tag types, backup plan owners and backup products. The platform may allow Systems of Record (SoR) to source entity and entity hierarchies for individual lists of enterprise assets, asset bills of material (as described herein), application asset lists, and affinity group asset lists. SoR may also source backup events via various backup products. The platform may allow data, application and/or backup owners to specify protection plan agreements, to tag references in entities, data protection plans, agreements, etc., and to periodically certify protection plan agreements for entities. The platform may provide for mapping of a backup product's execution data to the data model's constructs. The platform may align data stored according to the data model's schema for query efficiency with respect to day-to-day operational reporting, analytical queries (e.g., (configuration and execution anomalies), and data science datasets (e.g., stratifying data to aid with interoperability with external datasets). The platform and data model may prevent ad-hoc code development for disaster recovery operations with respect to various asset categories (e.g., individual assets or asset groups such as applications or affinity groups).

In accordance with aspects, a data model for a disaster recovery management platform may be based on an entity object (also referred to herein simply as an "entity"). An entity object, as used herein, may be an instantiable data object based on the data model and defined as a supertype abstraction for objects that may define, be related to, or participate in data protection plans, backup events, certification events, billing processes, etc. Such supertype abstraction facilitates streamlined configurability and reduces query I/O overhead in a corresponding disaster recovery management system. It is contemplated that all objects described herein with respect to the subject data model may be defined by included fields (also known as attributes), and those fields may be set to values of particular or specified data types. The values may be configurable and may serve as the basis for modeling an object of a particular type as one or more real-world data points that exists on a technology infrastructure of an organization. Objects based on the data model may be persisted in non-volatile storage, such as a database, and may be instantiated in random access memory for access and manipulation by a computer application.

An entity may be an abstraction of a digital asset or artifact that exists and is accessible within an organization's technology infrastructure. An entity may act as an abstraction that can singularly identify either a single asset or a grouping of assets. An entity may be associated with a corresponding asset or artifact and may be used to specify the associated asset or artifact for participation in a disaster recovery event (such as a backup event, a restore event, a certification event, etc.).

An asset may be one of several defined subtypes. For instance, an asset may be a database entity, an operating system (OS) entity, a storage entity (e.g., a particular hard drive or a logical partition of one drive or spanned across many drives), etc. An asset that is associated with an entity may be included in an entity hierarchy. That is, a given entity may have a parent entity and may have one or more child entities. An entity hierarchy may describe the bill-of-material (BOM) relationships of entity subtypes (e.g., applications, assets, affinity groups, etc.) As used herein, a BOM describes a hierarchy of components for which a backup operation may be targeted and encapsulates all referenceable assets under it. An exemplary BOM may include a host (e.g., a server) containing folders as well as database instances. A backup operation targeted at the host may include the host's operating system plus any database instance(s) executing on that host. Alternatively, a backup could target a specific database instance. A BOM may include any number and any type of hierarchical levels, in accordance with the granularity of asset tracking performed by the platform. Technical advantages of a hierarchical BOM include the ability to rapidly understand what is backed up redundantly and/or what may be missing from all backup instances.

An entity may define subtypes beyond an asset. For example, an entity be of subtype "asset," or it may be of subtype "application" or "affinity group." An entity object may encapsulate the various entity subtypes. When an entity object is instantiated in an object-oriented programming language, the entity object may act as an interface object to its subtypes. Accordingly, an entity is an abstraction to singularly identify an asset or a grouping of assets, e.g., an application (tightly coupled functionally dependent assets associated with a computer application) or an affinity group (loosely coupled, functionally independent assets).

A user, such as a data protection engineer, may assign a data protection plan to an entity. Data protection plans may be pre-defined by data protection engineers and may include information such as backup frequency and backup retention time. An asset entity may be a relatively granular object such as a file, or a file directory (including all files therein). An asset may also be a physical device, such as a server, a database, a storage drive, etc., and may include all directories, files, etc., that are associated with the physical device. An application entity may include assets that define or are included as a part of a particular computer application. For instance, an application entity may include attributes such as binary (executable) files, associated data directories, associated database files, associated library files, associated OS registry entries, etc. An affinity group asset may be a user-defined collection of asset entities that are related in the context of a business group, a business process, or some other logical organizational construct, and may include asset entities and application entities as necessary or desired.

FIG. 1 is a block diagram of a data model for a disaster recovery management platform, in accordance with aspects. Data model 100 includes entity 110, tag 112, and entity hierarchy 114. Data model 100 also include asset entity 120, application entity 122, and affinity group entity 124, each of which may be instantiated as an object in memory, and each of which represents a subtype of entity 110. Tag 112 is related to entity 110 with a one-to-many relationship, indicating that there may be many tags associated with a single entity. Tags may be associated with an entity for reporting purposes, and reports may be generated based (at least partially) on supplied tags associated with an entity. A tag may be descriptive text (e.g., a word or a phrase) that can be associated with an entity. A tag may have many tag types (not shown) as defined subtypes of a tag object. Entity 110 is related to entity hierarchy 114 via a recursive relationship. The dual parent and child relationships between entity 110 and entity hierarchy 114 describe the recursive hierarchy of entities. Further, entity 110 is a supertype of 3 distinct subtypes, namely asset entity 120, application entity 122, and/or affinity group entity 124.

A data model for a disaster recovery management system may additionally include a protection plan agreement. An entity may be related to one or many protection plan agreements generated for the entity (by, e.g., one or more users with appropriate permissions with respect to the entity) and may include one or many protection plan detail objects. A protection plan agreement may identify and record the assignment of a data protection plan to an entity. Protection plan details for a protection plan agreement may include data protection details such as backup frequency, backup retention period, backup scope, whether an associated asset will be backed up incrementally (i.e., only contents that have changed) or fully (a complete backup), etc.

With continued reference to FIG. 1, entity 110 is related to protection plan agreement 116 via a one-to-many relationship. That is, entity 110 may be associated with one or several protection plan agreements. Protection plan agreement 116, in turn, may have a one-to-many relationship with protection plan detail 118. Each of protection plan agreement 116 and protection plan detail 118 may be instantiable as an in-memory data object. A protection plan agreement for an entity may include several details that define the protection plan for the related entity. Data protection plan 130 may specify a retention 152 and may specify a frequency 154. Data protection plan 130 may also have a 1 or more relationship with policy detail 150 and policy detail 150 may be associated with protection plan detail 118.

Policy detail 150 may include other details not shown in FIG. 1, such as backup scope and backup type (e.g., incremental or complete).

A data model for a disaster recovery management system may facilitate one or many protection plan agreements being associated with a data protection plan. A data protection plan 130 may include data protection policy details via a policy detail (object) 150 and including data such as a designated backup product (object) 132. Backup product 132 may be an abstraction defined in the data model that represents a commercially available or custom-built data backup/restore program that will execute a backup event as defined in a data protection plan. A backup product may be associated with, and responsible for executing, many data protection plans. Data protection plan execution may include execution of some, or all, of the protection plan details associated with each entity that is, in turn, associated with a particular data protection plan.

With reference again to FIG. 1, data protection plan 130 may be associated with protection plan agreement 116 via a one-to-many relationship, indicating that a data protection plan may be a part of one or more protection plan agreements. Additionally, backup product 132 is associated with data protection plan 130 via a one-to-many relationship indicating that backup product 132 may be associated with one or more data protection plans. Each of data protection plan 130 and backup product 132 may be instantiated as an object in memory.

Backup product 132 may be associated with backup event 142. Backup event 142 is a transaction event that represents the execution of data protection plan 130. Backup events may be generated over the course of time at the frequency described by a data protection plan. Data protection plan 130 may reference many instances of protection plan detail 118 that are related to protection plan agreement 116 and data protection plan 130.

Certification event 140 is also a transaction event. Entity hierarchy 114 and protection plan agreement 116 are both related to certification event 140 via one-to-many relationships. That is, each of entity hierarchy 114 and protection plan agreement 116 may be associated with one or more of certification event 140. A certification event may include a user certifying that a protection plan agreement meets all organizational and regulatory requirements and/or best practices for data retention and disaster recovery specific to the level of certification, which, e.g., may be all child entities under a parent application entity. As a result, each application may individually certify that assets it uses are backed up, which may include multi-tenant assets (i.e., also used by other applications). Notably, protection plan agreements, in conjunction with backup events may include an indication that an entity is not backed up, and such a protection plan agreement may be certified to indicate that a related entity is not required to be backed up. Certification events may be scheduled on a reoccurring basis. For instance, a disaster recovery management framework may prompt users (e.g., through a UI of the framework) to certify related protection plan agreements for entities that the user is indicated as owning or being responsible for.

In accordance with aspects, a user profile that is associated with a human user (a user) of a disaster recovery management platform may be associated with an entity as defined in a data model for the disaster recovery management platform. A user profile may be stored by an organization and may describe the user and store information associated with the user such as a username, password, personal information, access permissions to different data and applications existing on the network (e.g., to different entities existing on the network), etc. An association of a user profile with a particular entity (e.g., as stored in a database) may indicate that a user profile (and, in turn, the corresponding user) is responsible for managing a disaster recovery plan (i.e., a protection plan agreement and/or a data protection plan), of or including the entity.

A disaster recovery management platform may include a disaster recovery management database for storing relations between entities and the user profiles responsible for managing the entities' data protection plan. A disaster recovery management database may also be configured with a schema to store data according to a disaster recovery management data model as discussed herein. Data stored in a disaster recovery management database (a DRM database) may be queried from and written to the database by a disaster recovery management application using object-relational mapping techniques or other techniques. That is, a disaster recovery management application (a DRM application) may write objects instantiated to random access memory (RAM) by the DRM application to the database for persistent storage of the object's state. Additionally, a DRM application may query objects from the database and instantiate them in RAM as an object for manipulation and processing of the object. Accordingly, a data model for a disaster recovery management system may be efficiently processed and persisted by a DRM application.

Services of a DRM application may be accessible to a user via an interface of the DRM application. A user interface may be, e.g., a web-based user interface hosted by a web server. The interface may present various services provided by a DRM application to a user and may allow interaction by a user with the services via manipulation of the interface. The interface may provide user profile authentication and/or verification services in order to identify a user and associations of the user. For instance, a user may be required to authenticate with a username and a password (and/or other challenge data such as biometric data) before accessing other services of a DRM application. Once authenticated, a DRM application may retrieve entities associated with the user as indicated by stored relationships that link the user to the entities. Additionally, users may associate themselves with entities that they are responsible for. The DRM application interface may display the entities and other information, such as data protection plans associated with entities, protection plan details associated with entities, an entity type, an entity name, and/or other data collected/persisted as part of a data model for a disaster recovery management system.

A DRM application may facilitate generation of a protection plan agreement for an entity by a user. For an entity that is associated with a user, the user may construct a protection plan agreement by specifying one or more protection plan details for the entity. For instance, a DRM application interface may display an entity that a user is associated with and receive input from the user specifying protection plan details such as backup frequency, backup retention period, backup scope, etc. The added details may comprise a protection plan agreement for the relevant entity. A protection plan agreement may have a one-to-many relationship with protection plan details, and a particular protection plan agreement may specify configuration details for all or some protection plan details available for an protection plan agreement for an entity.

Figure 2:
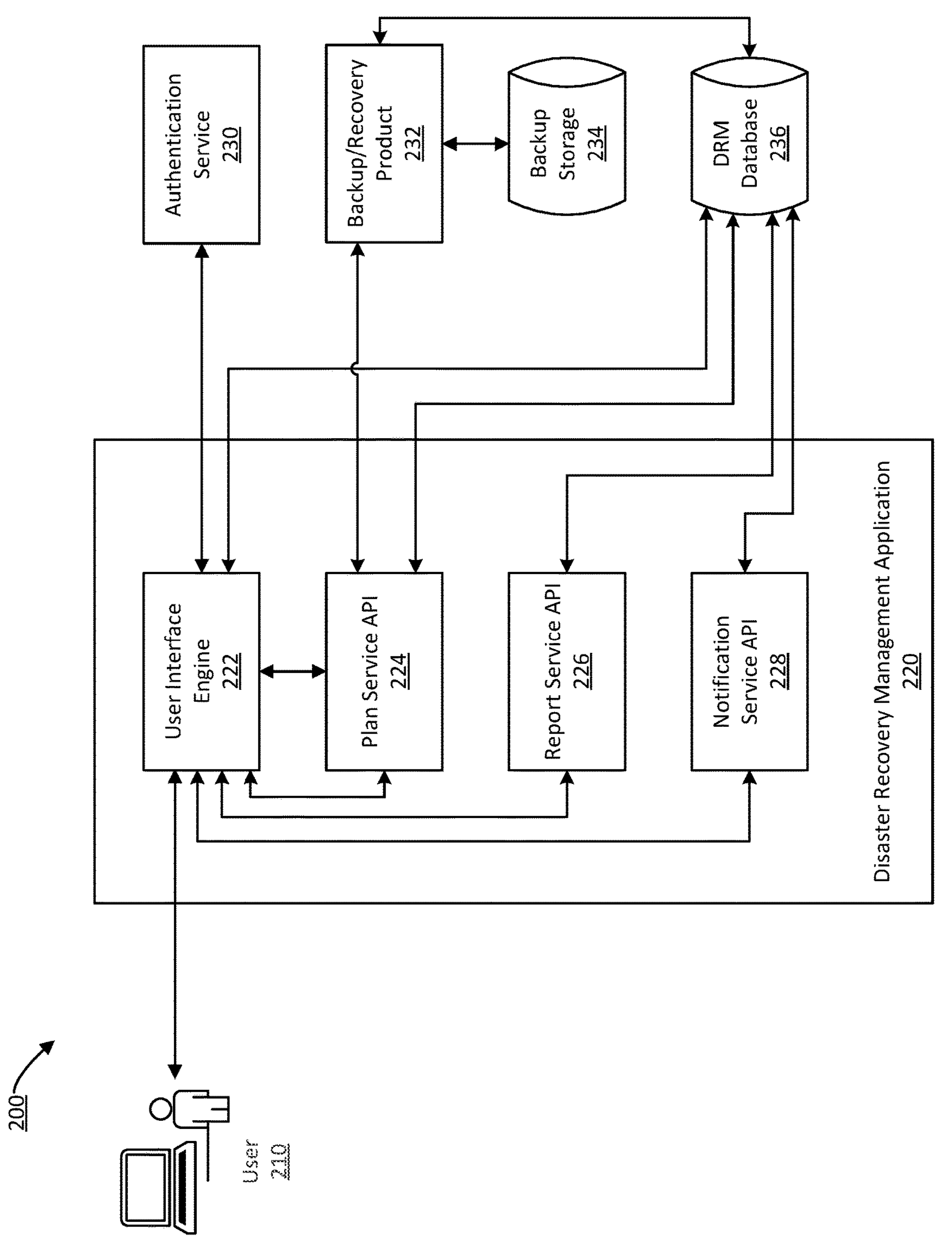
FIG. 2 is a block diagram of a disaster recovery management (DRM) platform, in accordance with aspects.

FIG. 2 is a block diagram of a disaster recovery management (DRM) platform, in accordance with aspects. DRM platform 200 includes disaster recovery management application 220. Disaster recovery management application 220 provides user interface engine 222, plan service API 224, report service API 226. And notification service API 228. DRM platform 200 may also include, or interact with, authentication service 230 and backup and recovery product 232 and backup storage 234. DRM platform 200 may further include DRM database 236.

In accordance with aspects, systems described herein may provide one or more application programming interfaces (APIs) in order to facilitate communication among the various components of a DRM platform. APIs may publish various methods and expose the method for use. A published API method may be called by an application, or a sub-part thereof, that is authorized to access the published API methods. API methods may take data as one or more parameters of the called method. A publishing service may execute the called method, perform processing on any data received as parameters of the called method, and send a return communication to the method caller. A return communication may also include data based on the called method and its data parameters. APIs, as discussed herein, may be based on any suitable API architecture. Exemplary API architectures and/or protocols include SOAP (Simple Object Access Protocol), XML-RPC, REST (Representational State Transfer), or the like.

User interface engine 222 may provide an interface for user 210 to access and interact with disaster recovery management application 220. User interface engine 222 may be configured to be in operative communication with plan service API 224, report service API 226, and notification service API 228. User 210 may construct protection plan agreements by specifying an entity and indicating protection plan details for the entity. User interface engine 222 may make application programming interface (API) calls to plan service API 224, including data indicated or specified by the user as data parameters of the API methods. For instance, an API method exposed by plan service API 224 may be a "createProtectionPlan" method, and may require parameters such as an entity identifier, a backup frequency, a backup scope, and/or other protection plan details supported by a DRM data model.

Upon receipt of a parameterized method, plan service API 224 may execute method logic that creates an protection plan agreement for a specified entity. Plan service API 224 may make execute a create or update procedure to DRM database 236 to persist the protection plan agreement created by the API method call. Moreover, plan service API 224 may be in operative communication with backup and recovery product 232 and may communicate protection plan agreement details and/or data protection plan details, including frequency details, to backup and recovery product 232. Backup and recovery product 232 may, at an indicated frequency or time interval, execute the received protection plan agreement or data protection plan, and may write a log of the execution to DRM database 236.

Backup and recovery product 232 may persist backup data that is duplicated during execution of entity or data protection plan to backup storage 234. Backup storage 234 may be any appropriate storage medium (i.e., physical or logical disks, databases, removable media such as tapes or optical discs, etc.), and may be located in, or transported to, necessary or required geographical locations to facilitate reduced risk due to physical destruction of a primary data source.

User interface engine 222 may also be in operative communication with report service API 226 and notification service API 228 via exposed API communications. Report service API 226 may be configured to receive report parameters via an API method call from user interface engine 222 and use the received parameters as lookup keys in queries of DRM database 236. Report service API 226 may format reports based on data received from DRM database 236 and may communicate the reports via a return communication to user interface engine 222 for display to user 210 via user interface engine 222. Reports may include upcoming certification event, logs of previous certification events, upcoming backup events, logs of previous backup events, etc.

Notification service API 228 may communicate notifications to users via user interface engine 222 based on data received from backup and recovery product 232 and/or queried from DRM database 236. For instance, notifications may include backup event success or failure notifications, and other backup event notifications.

FIG. 3 is a logical flow for disaster recovery management.

Step 305 includes providing a data model, where the data model includes an entity object, the entity object represents at least one data point that exists on a technology infrastructure of an organization, the entity is related to an protection plan agreement object; and the protection plan agreement object is associated with at least one protection plan detail object.

Step 310 includes receiving, at a computer application, data parameters, where the data parameters correspond to fields of the data model, and where the data parameters include an entity type and at least one protection plan detail.

Step 315 includes instantiating an instance of the entity object, an instance of the protection plan agreement object and an instance of the at least one protection plan detail object, where the data parameters are used to populate corresponding fields of the entity object, the protection plan agreement object, and the protection plan detail object.

Step 320 includes configuring a database schema of a database to persist data according to the data model.

Step 325 includes writing, by the computer application, the instance of the entity object, including the instance of the protection plan agreement object and the instance of the at least one protection plan detail object to the database.

Step 330 includes executing, by a backup product, a data backup event based on the at least one protection plan detail.

Figure 4:
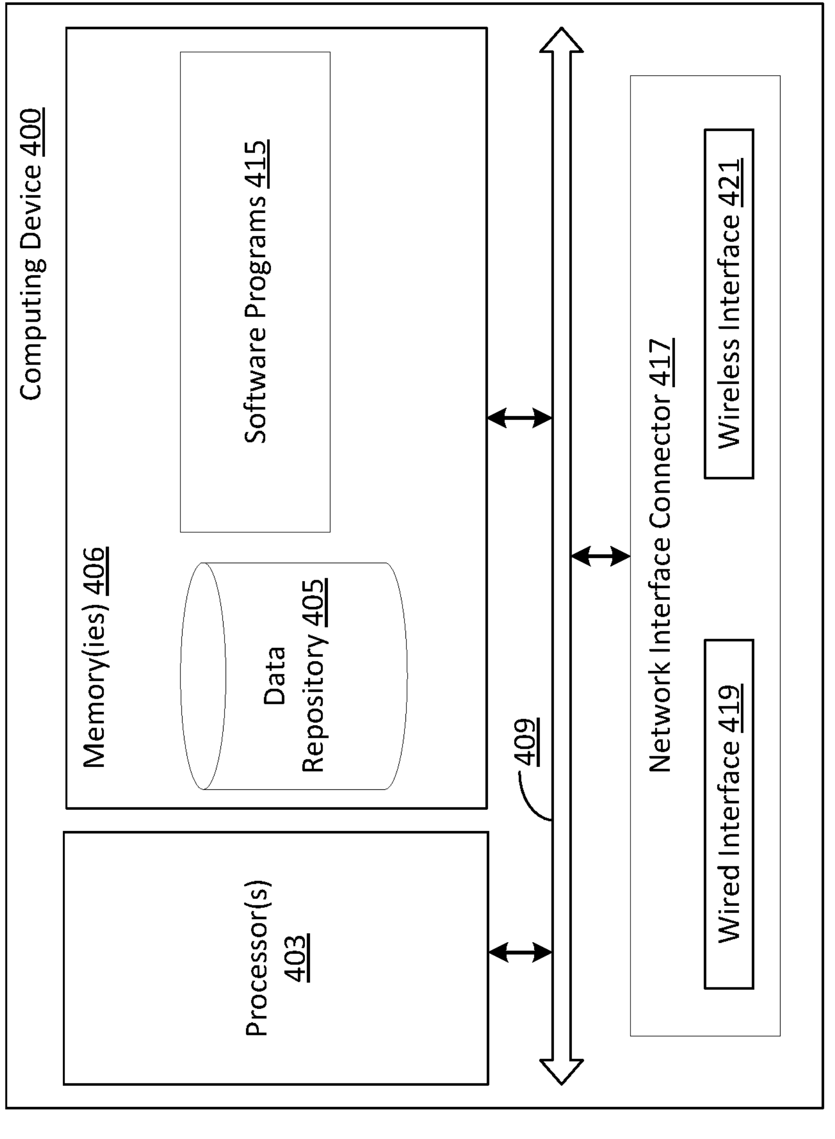
FIG. 4 is a block diagram of a computing device for implementing certain aspects of the present disclosure.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such as a DRM application and its subcomponents such as a user interface engine, a plan service API, a report service API, and a notification service API, and other computer applications and logic may include, and/or execute on, components and configurations like, or similar to, computing device 400.

Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

The system of the invention or portions of the system of the invention may be in the form of a "processing machine" a "computing device," an "electronic device," etc. These may be a general-purpose computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:

providing a data model comprising an entity object that is an abstraction of a digital asset within a technology infrastructure of an organization and is related to a protection plan agreement object for a protection plan agreement, wherein the protection plan agreement object is associated with at least one protection plan detail object, wherein the protection plan agreement identifies digital assets that are not required to be backed up;

receiving, at a computer application, data parameters that correspond to fields of the data model, and include a digital asset type and at least one protection plan detail that is defined by a user;

instantiating an instance of the entity object comprising an instance of the protection plan agreement object and an instance of the at least one protection plan detail object;

populating corresponding fields of the entity object, the protection plan agreement object, and the at least one protection plan detail object with the data parameters;

selecting a data backup product out of a plurality of data backup products based on the protection plan agreement;

executing, using the selected data backup product, a data backup event; and executing a certification event that certifies that all digital assets used by the protection plan agreement object were backed up in the data backup event or are not required to be backed up by the protection plan agreement.

2. The method of claim 1, comprising:
configuring a database schema of a database to persist data according to the data model.

3. The method of claim 2, comprising:
writing, by the computer application, the instance of the entity object, including the instance of the protection plan agreement object and the instance of the at least one protection plan detail object to the database.

4. The method of claim 1, wherein the data model includes a data protection plan object, wherein the data protection plan object is related to the protection plan agreement object, and wherein the data protection plan object includes a backup product field.

5. The method of claim 4, comprising:
instantiating an instance of the data protection plan object, wherein the backup product field is populated with a value that specifies the data backup product.

6. The method of claim 1, wherein the entity object is a subtype object.

7. The method of claim 6, wherein the subtype object is an application entity.

8. A system including at least one computer, wherein the at least one computer includes a memory and a processor, wherein the memory is coupled to the processor, wherein the memory stores program instructions executable by the processor, and wherein the program instructions configure the processor to:
provide a data model, comprising an entity object that is an abstraction of digital asset within a technology infrastructure of an organization and is related to a protection plan agreement object for a protection plan agreement, wherein the protection plan agreement object is associated with at least one protection plan detail object;
receive data parameters that correspond to fields of the data model, and wherein the data parameters include an entity type and at least one protection plan detail;
receive data parameters that correspond to fields of the data model, and include a digital asset type and at least one protection plan detail that is defined by a user;
instantiate an instance of the entity object in the memory, comprising an instance of the protection plan agreement object and an instance of the at least one protection plan detail object;
populate corresponding fields of the entity object, the protection plan agreement object, and the at least one protection plan detail object with the data parameters;
select a data backup product out of a plurality of data backup products based on the protection plan agreement;
execute, using the selected data backup product, a data backup event; and
execute a certification event that certifies that all digital assets used by the protection plan agreement object were backed up in the data backup event or are not required to be backed up by the protection plan agreement.

9. The system of claim 8, wherein the program instructions configure the processor to:
configure a database schema of a database to persist data according to the data model.

10. The system of claim 9, wherein the program instructions configure the processor to:
write the instance of the entity object, including the instance of the protection plan agreement object and the instance of the at least one protection plan detail object to the database.

11. The system of claim 8, wherein the data model includes a data protection plan object, wherein the data protection plan object is related to the protection plan agreement object, and wherein the data protection plan object includes a backup product field.

12. The system of claim 11, wherein the program instructions configure the processor to:
instantiate an instance of the data protection plan object, wherein the backup product field is populated with a value that specifies the data backup product.

13. The system of claim 8, wherein the entity object is a subtype object.

14. The system of claim 13, wherein the subtype object is an application entity.

15. A non-transitory computer readable storage medium, including instructions stored thereon, which instructions, when read and executed by one or more computer processors, cause the one or more computer processors to perform steps comprising:
providing a data model comprising an entity object that is an abstraction of a digital asset within a technology infrastructure of an organization and is related to a protection plan agreement object for a protection plan agreement, wherein the protection plan agreement object is associated with at least one protection plan detail object, wherein the protection plan agreement identifies digital assets that are not required to be backed up;
receiving data parameters that correspond to fields of the data model, and include a digital asset type and at least one protection plan detail that is defined by a user;
instantiating an instance of the entity object comprising an instance of the protection plan agreement object and an instance of the at least one protection plan detail object populating corresponding fields of the entity object, the protection plan agreement object, and the at least one protection plan detail object with the data parameters;
selecting a data backup product out of a plurality of data backup products based on the protection plan agreement;
executing, using the selected data backup product, a data backup event; and
that certifies that all digital assets used by the protection plan agreement object were backed up in the data backup event or are not required to be backed up by the protection plan agreement.

16. The non-transitory computer readable storage medium of claim 15, comprising:
configuring a database schema of a database to persist data according to the data model.

17. The non-transitory computer readable storage medium of claim 16, comprising:
writing the instance of the entity object, including the instance of the protection plan agreement object and the instance of the at least one protection plan detail object to the database.

18. The non-transitory computer readable storage medium of claim 15, wherein the data model includes a data protection plan object, wherein the data protection plan object is related to the protection plan agreement object, and wherein the data protection plan object includes a backup product field.

19. The non-transitory computer readable storage medium of claim 18, comprising:
instantiating an instance of the data protection plan object, wherein the backup product field is populated with a value that specifies the data backup product.

20. The non-transitory computer readable storage medium of claim 15, wherein the entity object is a subtype object, and wherein the subtype object is an application entity.

* * * * *